United States Patent [19]

Schüler

[11] 4,299,133
[45] Nov. 10, 1981

[54] GEARING

[76] Inventor: Werner Schüler, Renngasse 14, 1010 Vienna, Austria

[21] Appl. No.: 30,152

[22] Filed: Apr. 16, 1979

[30] Foreign Application Priority Data

Apr. 17, 1978 [AT] Austria ................................ 2658/78

[51] Int. Cl.³ .............................................. F16H 1/06
[52] U.S. Cl. ..................................... 74/415; 74/84 R; 74/351; 74/63
[58] Field of Search .................. 74/415, 351, 84, 84 S, 74/63 R

[56] References Cited

U.S. PATENT DOCUMENTS

| 1,622,841 | 3/1927 | Powell | 74/63 R |
| 2,116,127 | 5/1938 | Steiert | 74/84 X |
| 2,486,393 | 11/1949 | Dyer | 74/84 |
| 3,461,601 | 8/1969 | Kristiansen | 74/415 X |

Primary Examiner—C. J. Husar
Assistant Examiner—Conrad Berman
Attorney, Agent, or Firm—Salter & Michaelson

[57] ABSTRACT

A gearing has on its driving shaft a drive means carrier member carrying drive means in the form of pins protruding towards a driven means carrier member fixed to the driven shaft and carrying divergently arranged driven means. The driven shaft is offset relative to the driving shaft so that the circular orbital path of movement of the driven means surrounds the circular orbital path of movement of the driven means. From the drive means always only one single drive means contacts a driven means and only in a portion of the orbital path thereof which portion is more remote from the axis of the driven shaft than that portion of this orbital path arranged nearer to the driven shaft. In the other portions of their orbital path, the drive means pass within the orbital path of the driven means but do not contact these. This results in an increased torque of the driven shaft. Generally the speed of revolution of the driven shaft is not uniform but can be made uniform and equalized to the speed of revolution of the driving shaft by using an additional drive means, for example a belt drive means, for the driven means carrier member.

14 Claims, 7 Drawing Figures

GEARING

BACKGROUND OF THE INVENTION

The present invention refers to a gearing in which a rotating carrier arranged on the driving shaft is provided with pins or tangs which rotate along a circular orbital path. These tangs cooperate for the purpose of transmitting the driving force from the driving shaft to the driven shaft with studs of constant length which in turn are adapted to rotate along a circular orbital path and which are mounted on a rotating stud carrier carried on the driven shaft. The driven shaft is offset relative to the driving shaft.

Gearings for transmitting the driving force from one shaft to another shaft are known in various embodiments, for instance, as toothed-wheel gearings, belt drives, chain drives and so on. In belt drives or chain drives the driving shaft and the driven shaft must be arranged in a parallel manner relative to one another unless separate constructional parts are provided for changing the direction of the belt or chain, respectively, which results in an additional expenditure and reduced efficiency. Although this disadvantage is not present in toothed-wheel gearings, the ratio of revolutions between driving shaft and driven shaft is not variable and is dependent on the ratio of the number of teeth of the two meshing gear wheels.

It is an object of the present invention to provide a new gearing which is within certain limits not dependent on the direction of the driving shaft relative to the driven shaft and which does not require separate constructional parts which could undesirably result in a lower efficiency as compared to the efficiency of a gearing having both shafts arranged in a parallel manner. Furthermore, the present novel gearing permits a high driving torque and provides the ability to vary the number of revolutions of the driven shaft within certain limits. This task is, according to the invention, achieved in that the studs of the stud carrier protrude towards the tang carrier and are obliquely mounted relative to the axis of the stud carrier in a diverging manner such that the orbital path formed by the studs encircles the orbital path of the tangs. The tangs protrude from the tang carrier towards the stud carrier and the tangs engage the studs only in a portion of their orbital path. Said engaging portion of the orbital path of the tangs is located distal to the axis of the driven shaft. Within said contacting portion of said orbital path during which the tangs are contacting the studs, the driving force that is transmitted by the tang to the stud (noting that in view of the spatial arrangement of the driven shaft and in view of the driven shaft being offset relative to the driving shaft), results in an increased torque due to the longer effective lever arm of the contacted stud than that of the tang which is in contact with such stud and is effective for rotating the stud carrier.

In fact, the tang in consideration slides off the stud at the end of said engagement portion of its orbital path, however, the next following tang will engage a further stud just shortly afterwards, so that torque transmission from the driving shaft to the driven shaft will not experience an essential interruption. Rotation of the driven shaft is therefore, as a rule, not uniform but rotation of the driven shaft can be equalized by additional measures to be later explained in more detail. In many areas of application, for instance, in conveying systems compressors, pump installations and so on, a uniform drive of the shaft is not necessary.

In view of the long lever arm with which the tangs act on the studs, there results a high torque output to the driven shaft which is of advantage for many applications.

According to a particularly simple embodiment of the invention, the tangs are formed of pins protruding from the tang carrier in the direction of its axis and in direction to the stud carrier and the studs are formed of rods obliquely protruding from the stud carrier. The expenditure required for such a construction is quite small and such a construction is a synoptical construction. The number of pins need not be the same as the number of rods. As a rule, the number of studs is the same as the number of tangs or the number of studs is greater than the number of tangs for driving the driven shaft as uniformly as possible.

In place of the rods obliquely arranged relative to the axis of the driven shaft, ribs protruding towards the tang carrier can be provided in place of the studs on the stud carrier. This also provides a simple, synoptical construction.

For reducing the friction between the tangs and studs and thus for increasing the efficiency, the pins are, according to a further development of the invention, provided with rollers running on the studs.

For certain arrangements of the studs and the tangs, respectively, jamming can occur when the tangs are running on the studs. To prevent such jamming the pins are, according to a further development of the invention, provided with bushings at their free ends in which bolts which protrude therefrom are yieldingly guided. For the same purpose it may be desirable to round the free ends of the pins or bolts, respectively.

The number of revolutions of the driven shaft can, according to the invention, be made more uniform by providing an additional drive means on the stud carrier, for example, a belt drive. Such an additional drive means will tend to rotate the stud carrier in its sense of rotation during such time intervals within which no tang is engaging a stud. For the intended purpose, a belt drive is particularly suitable because the existing belt slip can equalize irregularities resulting from different numbers of revolutions of tang carrier and of the stud carrier. Thus the rotational speed of the driven shaft can be equalized to the rotational speed of the driving shaft, the torque on the driven shaft being increased, however. The number of revolutions of the driven shaft can also be made more uniform by arranging weights on the stud carrier and, respectively, or on the studs for increasing the gyrating mass.

A further advantage of a construction according to the invention resides in that the present novel gearing functions even if the driven shaft does not assume an exactly parallel position relative to the driving shaft. Even variations of the position of both shafts can be accommodated within certain limits. A further advantage may be seen in that the studs and tangs need not be arranged uniformly spaced from each other.

DESCRIPTION OF PREFERRED EMBODIMENTS

Figure 1:
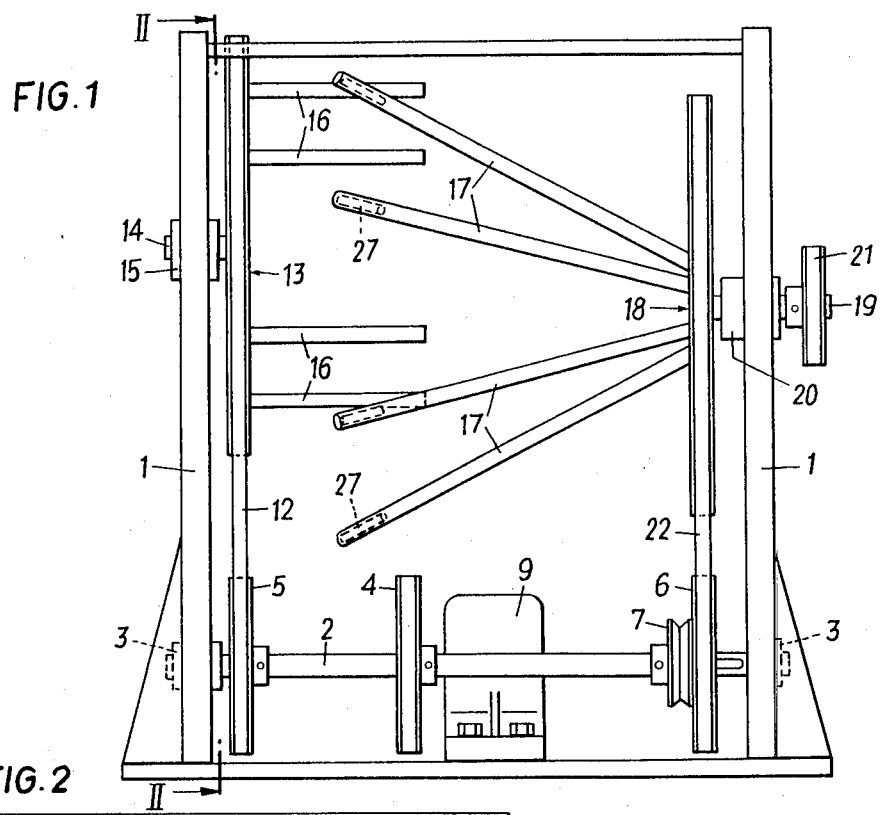

The invention is further illustrated with reference to embodiments shown in the accompanying drawing.

Figure 2:
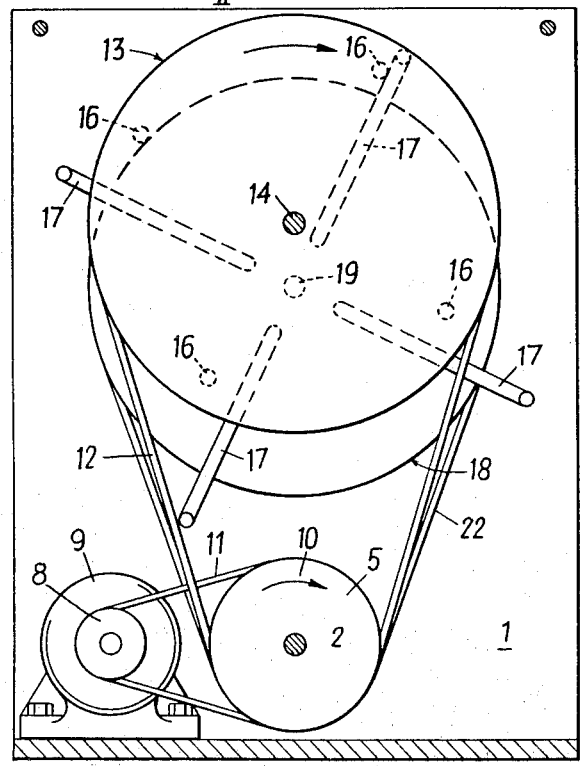
Figure 4:
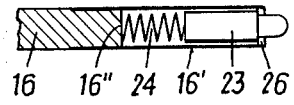
Figure 5:
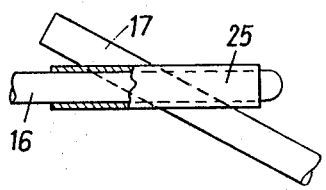
Figure 3:
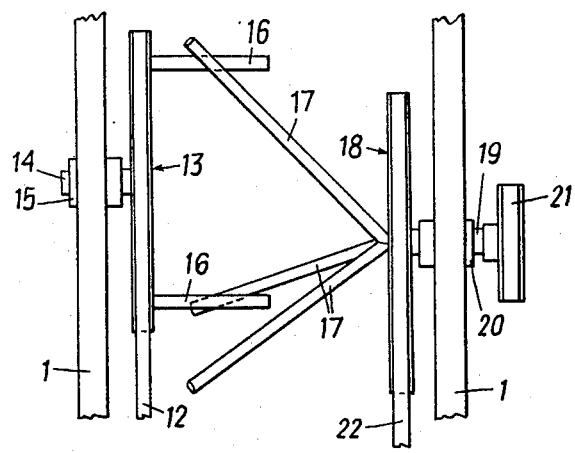
Figure 6:
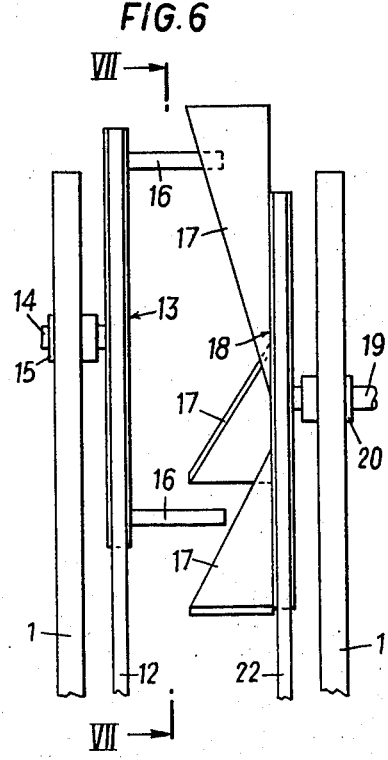
Figure 7:
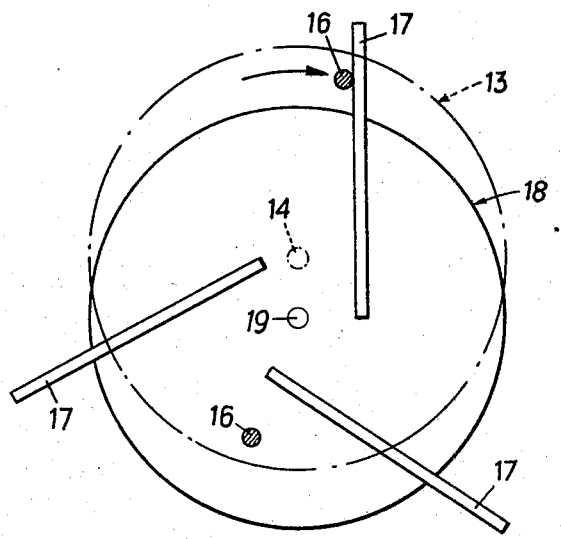

In the drawing:

FIG. 1 illustrates a lateral view of an embodiment of a gearing according to the invention, FIG. 2 is a section along line II—II of FIG. 1, FIG. 3 schematically illustrates a modified embodiment in a lateral view, FIG. 4 shows a detail in a section, FIG. 5 shows a further detail partially in a section, FIG. 6 shows a lateral view of a further modified embodiment and FIG. 7 is a section along line VII—VII of FIG. 6.

In the embodiment shown in FIGS. 1 and 2, a shaft 2 is supported in bearings 3 arranged within a frame 1. Belt pulleys 4 and 5 are fixed to said shaft 2. The belt pulley 4 is driven from the driving shaft 8 of a motor 9 by means of a belt 11 so that the shaft 2 is rotated in direction of arrow 10 (FIG. 2). The belt pulley 5 drives via a further belt 12 a belt pulley of greater diameter, which belt pulley forms a carrier member 13 for tangs or protrusions 16. This tang carrier 13 is with its shaft 14 rotatably supported within bearings 15 of the frame 1 and carries three protrusions 16 having the shape of pins having rounded ends and being parallely arranged relative to the axis 14 and being firmly anchored with the tang carrier 13. The protusions 16 cooperate with stud members 17 by taking them along and four such studs are fixed to a common stud carrier like spokes so that each two neighboring stud members 17 include equal angles. The studs 17 are formed of rods which extend diverging from a common center. The stud carrier 18 has also the shape of a belt pulley which is rotatably supported with its shaft 19 in a bearing 20 of the frame 1. Externally of the frame 1, the shaft 19 carries a driven belt pulley 21.

The operation is the following: The motor 9 drives via the belt 11 the belt pulley 4 and this belt pulley 4 drives the shaft 2. The belt pulley keyed to the shaft 2 drives via the belt 12 the tang carrier 13 keyed to the driving shaft 14. The tang carrier 13 drives with its prong-like tangs 16 the stud carrier 18 via its prong-like studs 17 arranged in a radiating pattern so that the driving shaft 19 and thus also the driven belt pulley 21 keyed thereon is rotated. In view of the orbital path portions, within which during rotation of the tang carrier 13 the tangs 16 contact the studs 17, there is present greater distance from the axis of the shaft 19 than from the axis of the shaft 14. Therefore, the torque acting on the shaft 19 is increased corresponding to the ratio of the lever arms. In this connection it is to be mentioned that within the lower portion of the circular orbital path of the tangs 16, these tangs move below the studs 17 arranged accordingly to a radiating pattern without contacting these studs. Thus, that portion of the orbital path of the tangs 16 which present shorter lever arms than the studs 17 is avoided.

Rotation of the drive shaft 19 is not uniform in the construction described up till now and is dependent on the number and the arrangement of the tangs 16 and the studs 17, respectively, as a rule, less rapid than the rotation of the driving shaft 14. In case that this circumstance is disturbing, an additional drive means can be provided for the driven shaft 19, which additional drive means can be formed of an arrangement in which a belt pulley 6 drives via a further belt 22 the stud carrier 18 which for such embodiment has the shape of a belt pulley. In this manner, both shafts 14 and 19 can be brought to rotate with the same number of revolutions, if the transmission ratios of the belt drives 12, 22 are correspondingly chosen, for example by equal diameters of the belt pulleys 5, 6 and 13, 18, respectively.

The number of tangs 16 and of the studs 17, respectively, is dependent on the special operating conditions and on the desired transmission ratios. As is shown in FIG. 3, there can also be conceived an embodiment having only two tangs 16 and only three tangs 17. The tangs 16 may also protrude beyond the circumference of the tang carrier member 13. For example, the tang carrier member 13 may have radially extending arms which carry the tangs protruding towards the stud carrier member.

During rotation, the tangs 16 slide on the rod-like studs 17. With certain arrangement of the tangs relative to the studs, jamming of the tangs and of the studs could occur when the tang 16 is sliding off the stud 17. To avoid this, the pin-like tangs 16 are, as is shown in FIG. 4, given at their free ends the shape of bushings 16'. In each of these bushings 16', a bolt 23 is inserted in axial direction and resiliently pressed against the closed end 16" of the bushing 16 by means of a spring 24. The end of the belt 23 protrudes from the bushing 16' and is rounded to allow the bolt 23 to slide over the stud 17 with greatly reduced friction resistance. The bolt 23 can be secured against excessive protruding or extraction from the bushing 16' by means of a circlip 26 or the like.

FIG. 5 illustrates a feature by which friction between the tang 16 and the stud 17 sliding along said tang can be reduced. For this purpose the end of each tang 16 is provided with a roller 25 rotatably supported on said end and running on the stud 17. Circlips or the like, not shown, prevent the roller 25 from sliding off the tang 16.

In the embodiment shown in FIGS. 6 and 7, the studs 17, with which the tangs 16 cooperate, are formed of ribs on the stud carrier 18, which has the shape of a disc. These ribs protrude in a direction towards the tang carrier 13 which is equally formed of a disc and carries the tangs 16 having the shape of pins. The ribs forming the studs 17 may protrude over the circumference of the stud carrier 18 and be offset relative to a radial direction as shown in FIG. 7, so that the tangs 16 can more easily slide along the flanks of the ribs. Also in this embodiment, the tangs 16 contact the studs 17 only in that portion of their circular orbital path which is most distant from the driven drive shaft 19. Within the lower portion of this circular orbital path being located nearer to the driven shaft 19, the tangs 16 are, however, running past the studs 17.

As already mentioned, the number of revolutions of the driven shaft 19 need not be identical with the number of revolutions of the driving shaft 14. If, however, this is desired, an additional drive means provided by the belt pulley 6 and the belt 22 (FIG. 1) can be made use of. In this case, it is possible to arrange on the shaft 2 a plurality of belt pulleys 6, 7 of different diameter onto which the belt 22 is put according to the requirements. This provides the possibility to vary at will the number of revolutions of the driven shaft 19. In place of obliquely arranging the studs 17 acting as crank arms, the tangs 16 can also obliquely be arranged relative to the axis 14 of the tang carrier 13. If desired, the tangs 16 as well as the studs 17 can be obliquely arranged. Further the tangs 16 and, respectively, or the studs 17 can be curved over their whole length or over part of their length.

As is obvious, it is easily possible to have a plurality of gearings according to the invention to act on a common driven shaft 19. For example, in the arrangement according to FIG. 1, the driven shaft 19 can be extended over the belt pulley 21 keyed thereon and be provided in this extended portion with a further stud carrier 18, the studs of which are cooperating with the tangs of a further tang carrier. It is further possible to key to the driven shaft 19 a further tang carrier 13 whose tangs are cooperating with studs of a further stud carrier. In this manner two gearings according to the invention are connected in series in two steps. Such systems can be further developed at will. Where small differences between the numbers of revolution of the shaft 2 on the one hand and the driving shafts 14 and the driven shafts 19, respectively, are disturbing, these differences can be taken into consideration by the belt slip and, respectively, or by selecting belt pulleys of different diameters (for example belt pulleys 6, 7) or by slide clutches or by other means known per se.

A more uniformed rotation, particularly of the driven shaft 19, can be obtained by mounting gyrating weights 27 on the stud carrier 18, and, respectively, or on the studs 17. It is recommended to arrange these gyrating weights at the area of the free ends of the studs 17 and such that these gyrating weights 27 do not obstruct sliding movement of tangs 16 along the studs 17.

Of course, the additional drive means for the stud carrier member 18 must not be driven from the same motor 9 as the tang carrier member 13. For example, a second motor (not shown) may be provided to drive the said additional drive means.

What I claim is:

1. Gearing comprising a driving shaft and a driven shaft, a rotating driving means carrier member arranged on the driving shaft and being provided with driving means rotating along a circular orbital path, a rotating driven means carrier member arranged on the driven shaft and being provided with driven means rotating along a circular orbital path and cooperating with the drive means for the purpose of transmitting the driving force from the driving shaft to the driven shaft, said driven shaft being offset relative to said driving shaft, wherein said driven means protrude in direction towards the driving means carrier member and are arranged obliquely relative to the direction of the axis of the driven means carrier member in a diverging manner so that they encircle with their orbital path the orbital path of the driving means protruding from the driving means carrier member in a direction towards the driven means carrier member and wherein the drive means engage the driven means only in a portion of their orbital path, said engaging portion of the orbital path of the drive means being located distal from the axis of the driven shaft.

2. Gearing as claimed in claim 1, wherein said drive means are formed of pins protruding from the drive means carrier member in direction towards the driven means carrier member and wherein the driven means are formed of rods obliquely protruding from the driven means carrier member in direction towards the drive means carrier member.

3. Gearing as claimed in claim 1, wherein said drive means are formed of pins protruding from the drive means carrier member in direction towards the driven means carrier member and wherein the driven means are formed of ribs protruding from the driven means carrier member in direction towards the drive means carrier member.

4. Gearing as claimed in claim 1, wherein said drive means extend from said drive means carrier member in direction of its axis.

5. Gearing as claimed in claim 1, wherein said drive means are provided with rollers running on said driven means.

6. Gearing as claimed in claim 1, wherein said drive means have free ends, bushings being provided on these ends, bolts protruding from said bushings being guided yieldingly in said bushings.

7. Gearing as claimed in claim 6, wherein the ends of said bolts protruding from said bushings are rounded.

8. Gearing as claimed in claim 1, wherein the ends of the drive means are rounded.

9. Gearing as claimed in claim 1, wherein said driven means carrier member is driven by additional drive means.

10. Gearing as claimed in claim 9, wherein said additional drive means comprise a belt drive means for said driven means carrier member.

11. Gearing as claimed in claim 1, wherein said driven means carrier member carries gyrating weights to increase the gyrating mass.

12. Gearing as claimed in claim 11, wherein said gyrating weights are fixed to said driven means.

13. Gearing as claimed in claim 1, wherein said driven means have constant length, measured in direction of the axis of the driven shaft.

14. Gearing as claimed in claim 1, wherein the moment arm of the driven means is greater than the moment arm of the drive means in said engaging portions of the orbital path whereby increased torque is transmitted to the driven shaft thereby.

* * * * *